Aug. 30, 1949.  M. B. MOYER ET AL  2,480,595
SAW BLADE HOLDER AND DRIVER
Filed Oct. 22, 1946
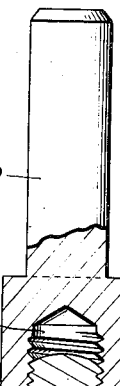
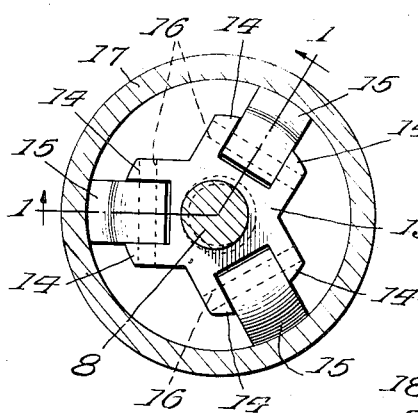
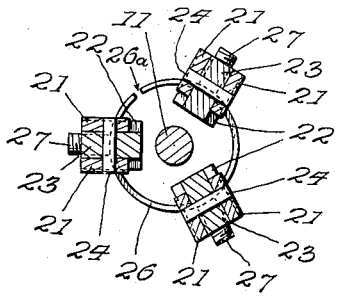
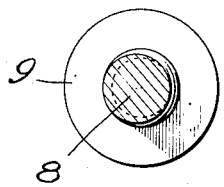
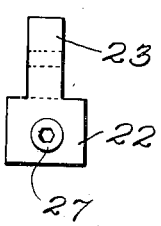
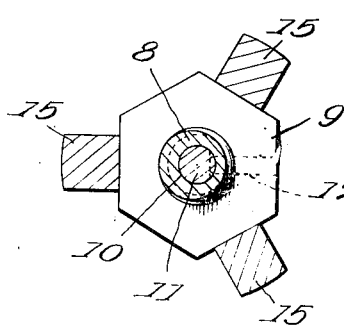
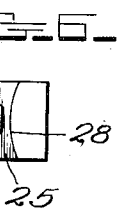
Inventors
Malcolm B. Moyer
and William F. Martin
By H. B. Willeson & Co.
Attorney Patented Aug. 30, 1949

2,480,595

UNITED STATES PATENT OFFICE 2,480,595

SAW BLADE HOLDER AND DRIVER

Malcolm B. Moyer and William F. Martin, Syracuse, N. Y.

Application October 22, 1946, Serial No. 704,864

3 Claims. (Cl. 77—69)

The invention relates to a new and improved device for holding a cylindrical saw blade and driving it to cut a circular hole about a predetermined axis.

The principal object of the invention is to provide a compact and practicable device which may be easily adjusted to hold any of a plurality of cylindrical saw blades of different diameters, obviating the necessity of providing a large-diameter head having concentric blade-holding grooves as heretofore customary.

A further object is to provide a saw embodying a cylindrical blade which is split from its toothed edge to its back edge, and blade-holding-and-driving means adjustable to spring said blade to different diameters, permitting minor plus and minus adjustments.

Another object is to provide a novel construction which may be easily and inexpensively manufactured, and marketed at a reasonable price, yet will be efficient and durable.

Fig. 1 is a longitudinal sectional view partly in elevation on line 1—1 of Fig. 2.

Figs. 2, 3 and 4 are transverse sectional views on the correspondingly numbered lines of Fig. 1.

Fig. 5 is an outer side elevation of one of the saw clamps.

Fig. 6 is an outer end view of one of the saw clamps.

Fig. 7 is a detail transverse section through the central screw showing a different form of head for said screw.

A preferred construction has been illustrated and will be rather specifically described, but attention is invited to the possibility of making variations within the scope of the invention as claimed.

A central longitudinal screw 8 is provided, said screw having a head 9 at its front end. This head may either be provided with a polysided peripheral edge (Fig. 3) or with an edge of circular outline (Fig. 7). The front end of the screw 8 is formed with a central socket 10 opening through the front end of the head 9 to receive the rear end of a pilot 11, said pilot being preferably in the form of a drill. The pilot may be secured in the socket 10 by means of a set screw or the like 12 (Fig. 3).

Adjustably threaded upon the screw 8, behind the head 9, is a collar 13 having pairs of peripheral lugs 14 between which forwardly diverging arms 15 are pivoted at 16 for radial swinging, the pivots 16 being disposed at the rear ends of said arms 15. These arms extend forwardly in contact with the peripheral edge of the head 9 of the screw 8 and are held in contact with said head by the cylindrical side wall 17 of a forwardly open cup 18 which is threaded upon the screw 8 behind the collar 13. A driving member 19 is provided, for engagement with a chuck or the like, the front end of said driving member having a socket 20 which is threaded adjustably upon the rear end of the screw 8. The front end of the member 19 abuts the cup 18 and said member, therefore, acts also as a lock-nut for said cup.

The arms 15 are each provided at their front ends with a pair of inwardly projecting fingers 21, and individual clamping blocks 22 are provided with ears 23 which are received between said fingers 21, said ears being pivoted to said fingers by means of pivots 24 which are parallel with the pivots 16. Each block 22 is formed with a forwardly open notch 25, and these notches of the blocks are adapted to receive the rear end of a cylindrical saw blade 26. Clamping screws 27 are threaded into the outer ends of the blocks 22 to abut the outer peripheral surface of the blade 26 for the purpose of clamping the inner peripheral surface of this blade tightly against the inner walls 28 of the blocks 22. The wall 28 of each block is concentric with the axis of the tool and its curvature is on a radius no greater than that of the inner periphery of the smallest blade to be clamped. Thus, regardless of the diameter of the blades to be held by the tool, the clamping screws 27 will have no tendency to warp said blade out of truly circular or tubular form.

To adjust the tool for holding and driving a saw blade of any selected diameter, the driving member 19 is first loosened and threaded rearwardly somewhat from the cup 18. This cup is then threaded rearwardly to free the annular series of clamp carriers or arms 15, whereupon these arms may be forwardly or rearwardly adjusted as required by rotating the collar 13 upon the screw 8. When the saw blade clamps have been so adjusted that the blade may be properly secured in the notches 25, the cup 18 is forwardly tightened to hold the arms 15 against the head 9, and the driving member 19 is forwardly tightened to lock said cup. It will thus be seen that the adjustment to hold a saw of one size or another, may be easily effected, and that the saw will be rigidly held in proper position for use.

The cylindrical saw blade 26 or any equivalent cutter may be continuous or may have a split 26a (Fig. 4) from its toothed edge to its back edge. When a split blade is used, its split 26a will be located between two of the blade holders 22 and by radially adjusting said holders, the blade may be sprung to slightly different diameters without change in its cylindrical form, thereby permitting minor plus and minus adjustments and adapting the tool for cutting holes of numerous diameters without requiring a separate saw for each diameter.

While excellent results may be obtained from the construction shown and described, and it may be considered as preferred, attention is again invited to the possibility of making variations within the scope of the invention as claimed.

We claim:

1. A saw blade holder and driver comprising a rotatable structure including clamp-carrying arms spaced equi-distantly about the axis of said structure, pivots at the rear ends of said arms and mounting the latter for radial swinging with respect to said axis, and adjusting means for swinging said arms about their pivots to different positions, said arms having their front ends disposed at the front end of said structure; individual clamps disposed at said front ends of said arms, and individual pivots mounting said clamps on said front ends of said arms, these pivots being parallel with the pivots of said arms, said clamps being forwardly open to receive and clamp the rear end of a cylindrical cutter blade of selected diameter.

2. A structure as specified in claim 1; each of said clamps comprising a block having a forwardly open cutter-blade-receiving notch, and a clamping screw disposed radially with respect to the aforesaid axis, said screw being threaded in the outer end of said block to abut the outer periphery of the cutter blade and clamp the inner periphery of said blade against the inner wall of said notch, said inner wall being curved on a radius no longer than that of the inner periphery of the smallest cutter blade to be held by said clamps.

3. A saw blade holder comprising a central longitudinal screw having a head at its front end, a collar threaded adjustably on said screw between its ends, longitudinal forwardly diverging arms spaced equidistantly around said collar and pivoted at their rear ends thereto for inward and outward swinging, said arms extending forwardly beyond said head and contacting with the periphery of the latter, cutter blade clamps carried by the front ends of said arms for jointly holding a cylindrical cutter blade, a cup threaded adjustably on said screw behind said collar, said cup having a forwardly projecting side wall surrounding said arms and contacting therewith to hold said arms against said head, and a driving member threaded adjustably on the rear end of said screw and abutting said cup to lock the latter on said screw.

MALCOLM B. MOYER.
WILLIAM F. MARTIN.

REFERENCES CITED

The following references are of record in the file of this patent:

UNITED STATES PATENTS

| Number | Name | Date |
|---|---|---|
| 106,308 | Bateman | Aug. 16, 1870 |
| 703,538 | Cartwright | July 1, 1902 |
| 922,649 | Williams et al. | May 25, 1909 |
| 1,449,790 | Sprague | Mar. 27, 1923 |
| 1,522,102 | Cibelli | Jan. 6, 1925 |
| 1,590,994 | Misener | June 29, 1926 |
| 1,675,469 | Schreiner | July 3, 1928 |
| 1,855,873 | Shortell | Apr. 26, 1932 |
| 2,349,400 | Beckwith | May 23, 1944 |